US012137722B2

(12) United States Patent
Broderick

(10) Patent No.: US 12,137,722 B2
(45) Date of Patent: Nov. 12, 2024

(54) STEAM PEELING PRESSURE VESSEL

(71) Applicant: Tomra Sorting Limited, Dublin County (IE)

(72) Inventor: Michael Broderick, Carlow (IE)

(73) Assignee: TOMRA SORTING LIMITED, Dublin (IE)

( * ) Notice: Subject to any disclaimer, the term of this patent is extended or adjusted under 35 U.S.C. 154(b) by 1166 days.

(21) Appl. No.: 16/462,407

(22) PCT Filed: Nov. 21, 2017

(86) PCT No.: PCT/EP2017/079967
§ 371 (c)(1),
(2) Date: May 20, 2019

(87) PCT Pub. No.: WO2018/091748
PCT Pub. Date: May 24, 2018

(65) Prior Publication Data
US 2019/0364951 A1 Dec. 5, 2019

(30) Foreign Application Priority Data

Nov. 21, 2016 (EP) ..................................... 16199891

(51) Int. Cl.
*A23N 7/02* (2006.01)
*A23N 7/00* (2006.01)

(52) U.S. Cl.
CPC .............. *A23N 7/02* (2013.01); *A23N 7/005* (2013.01)

(58) Field of Classification Search
CPC ......... A47J 37/047; A47J 27/16; A23N 7/005; A23N 15/08; A23N 7/02

USPC ......... 99/348, 467, 479, 483, 516, 568, 584; 426/482, 511, 521, 519; 219/389, 400, 219/479
See application file for complete search history.

(56) References Cited

U.S. PATENT DOCUMENTS

| 2,287,014 | A | | 6/1942 | Edwin | |
|---|---|---|---|---|---|
| 4,222,322 | A | | 9/1980 | Van | |
| 4,393,756 | A | * | 7/1983 | van der Schoot | ..... A23N 7/005 99/348 |
| 2003/0170364 | A1 | * | 9/2003 | Broderick | .............. A23N 7/005 426/481 |
| 2007/0119312 | A1 | * | 5/2007 | Broderick | .............. A23N 7/005 99/584 |

(Continued)

FOREIGN PATENT DOCUMENTS

| EP | 1289385 B1 | 3/2006 |
|---|---|---|
| FR | 2647639 A1 | 12/1990 |

OTHER PUBLICATIONS

International Search Report (PCT/ISA/210) issued on Feb. 13, 2018, by the European Patent Office as the International Searching Authority for International Application No. PCT/EP2017/079967.

*Primary Examiner* — Phuong T Nguyen
(74) *Attorney, Agent, or Firm* — Boone IP Law

(57) ABSTRACT

A steam peeling vessel for rotation about an internal axis of rotation, including at least one internal lifter having a longitudinal axis oriented at an oblique angle to the internal axis of rotation of the vessel. The vessel may include at least two internal lifters. The vessel may include a first lifter oriented at a first oblique angle to the axis of rotation, and at least a second lifter oriented at a second oblique angle to the axis of rotation.

20 Claims, 8 Drawing Sheets

(56) References Cited

U.S. PATENT DOCUMENTS

2008/0217444 A1* 9/2008 Michalek .............. F26B 11/028
241/1

* cited by examiner

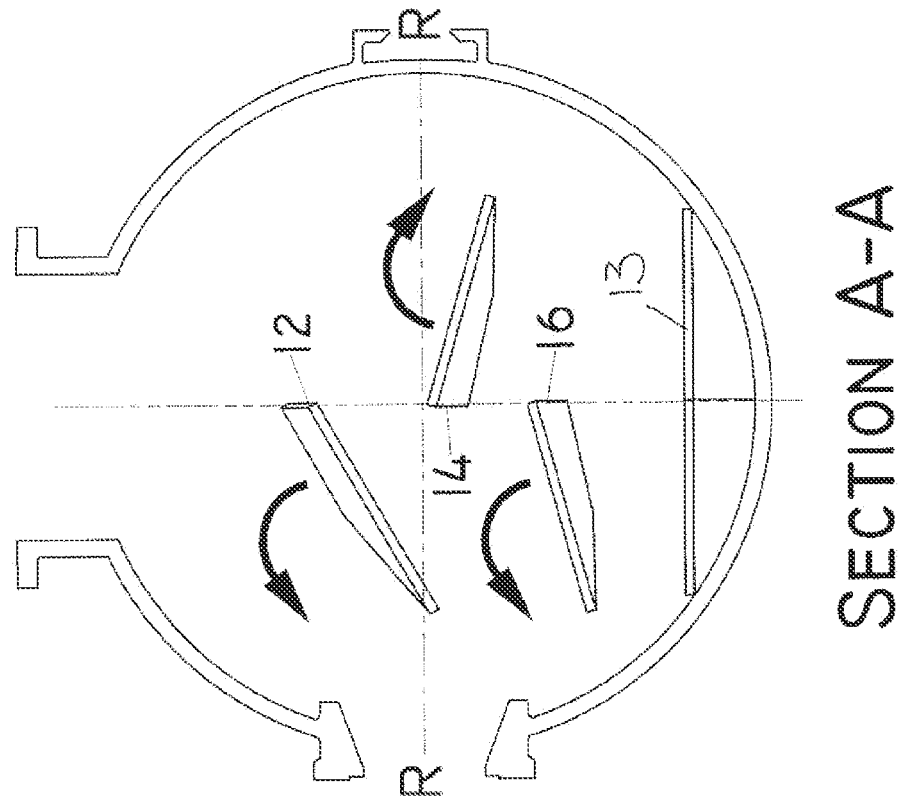
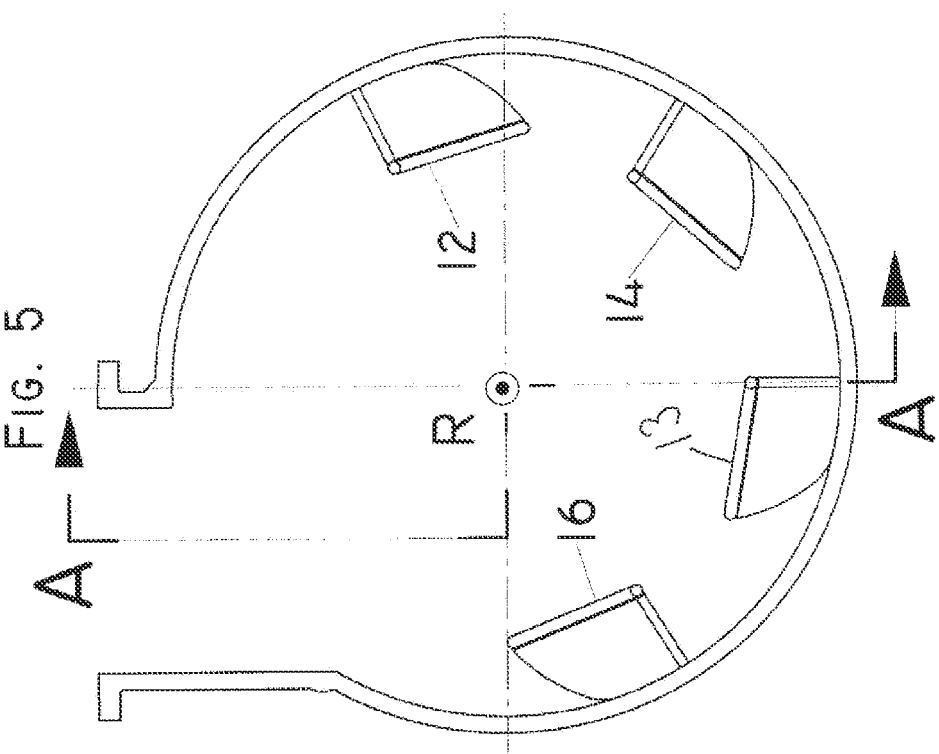

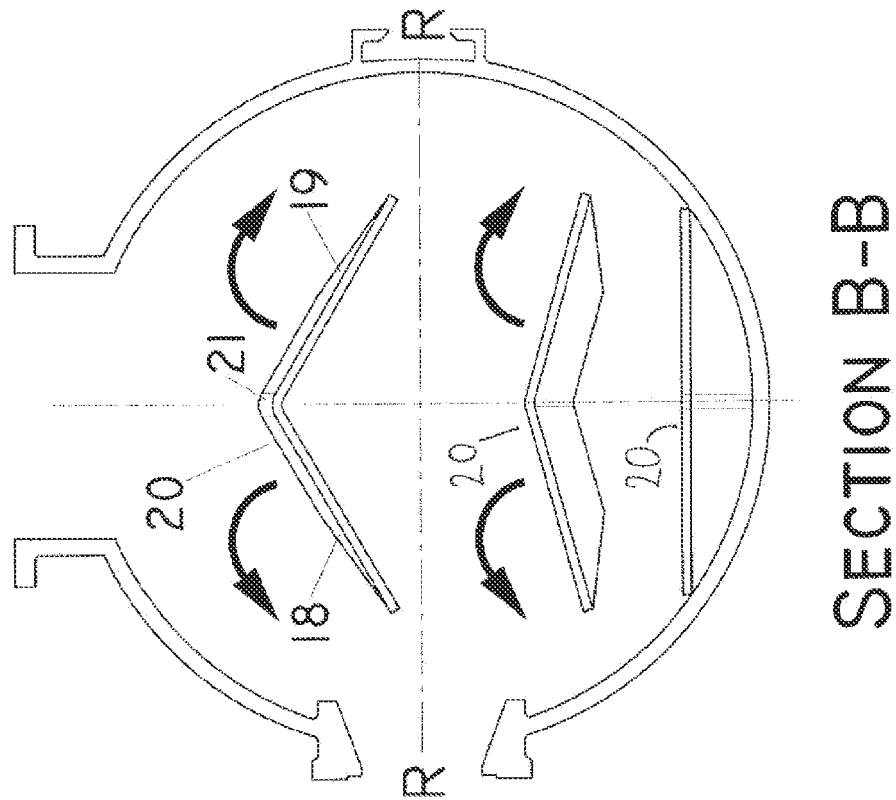
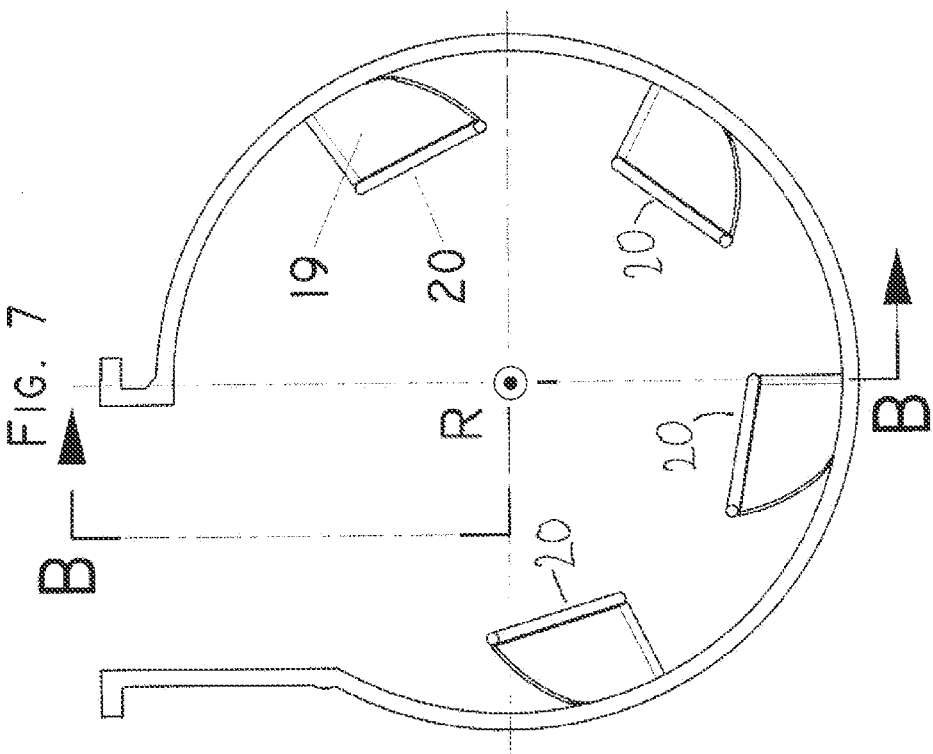

SECTION C-C

SECTION A-A

SECTION B-B

SECTION C-C

STEAM PEELING PRESSURE VESSEL

FIELD OF THE INVENTION

The present invention relates to steam peeling of vegetables, such as potatoes. In particular the present invention relates to an improved steam peeler pressure vessel.

BACKGROUND TO THE INVENTION

A prior art pressure vessel for steam treatment of vegetable, such as potatoes, product to be peeled in a steam peeling system is disclosed in EP1289385 (B1). The pressure vessel disclosed therein has at least one internal lifting feature for entraining and raising product relative to the axis of rotation of the pressure vessel during rotation of the pressure vessel. Each lifter comprises a protrusion extending inwards from the region of an interior surface of a wall portion of the pressure vessel, substantially in the direction of the axis of rotation of the vessel, in particular, substantially radially inwards. As such each lifter is aligned parallel to the axis of rotation of the vessel. Where the lifter has an elongate form, like a paddle, with a longitudinal axis, by "each lifter is aligned parallel to the axis of rotation of the vessel" it is meant that the longitudinal axis of each lifter is parallel to the axis of rotation of the vessel. The axis of rotation is an internal axis of rotation extending between opposing sides of the pressure vessel. In at least one embodiment the pressure vessel is substantially symmetrical, at least about an axis extending between opposed flattened side surfaces of the pressure vessel. In a particular construction, the pressure vessel is rotatable about said axis of substantial symmetry. Experimental investigations have shown that in the absence of lifters, there is a tendency for product to remain static at the base of the vessel during rotation of a vessel, the aggregate of product within the vessel behaving somewhat similarly to liquid or sand in such circumstances.

The or each internal lifting feature may extend directly from the interior wall surface of the wall portion of the pressure vessel, The lifters may be spaced apart at intervals around the internal periphery of the vessel and the vessel may contain large, medium and small lifters used in combination. One example of such prior art lifters is shown in the vessel of FIGS. 1 and 2.

It will be appreciate that potatoes are steam treated in batches rather than individually. Once a batch of potatoes are introduced into a vessel the potato furthest from the steam present in the vessel will define the peeling time for the whole batch. While this ensures all potatoes in the batch are peeled, it may result in potatoes nearest to the steam being over steamed and therefore over peeled, i.e. a higher peel loss is experienced.

This higher peel loss may be minimised though the use of lifters and high rotational speeds. The aim is to keep product moving by lifting it and letting it fall down in a different order as the vessel rotates. This helps to separate the potatoes with an aim of each potato in a batch being subjected to the same amount of steam treatment.

While prior art vessels with lifters such as those disclosed in EP1289385 (B1) address the problem of product remaining static at the base of the vessel during rotation of the vessel, there exists a further problem even when lifters are incorporated in the vessel. While the incorporation of at least one lifter in the vessel will ensure that product is lifted as the vessel rotates, prior art arrangements of lifters do not address the problem of potatoes bunching together during the lifting process. Such bunching can result in the batch of potatoes being lifted (and then falling) as a single mass as the vessel rotates, rather than as a plurality of individual objects. As a result, potatoes become compartmentalised (in virtual compartments) between the walls of the vessel. This is demonstrated in FIG. 3 wherein potatoes in location ("compartment") a are likely to remain in compartment a when the vessel is rotated about axis of rotation R-R, likewise b in b and c in c. The reason this is disadvantageous is that potatoes at the bottom of the pile in compartments a and c are closer to the steam than potatoes in the bottom of the pile in compartment b for example. Therefore potatoes in compartments a and c may be over peeled by the time all the potatoes in compartment b are peeled (remembering that the potato furthest from the steam present in the vessel will define the peeling time for the whole batch). FIG. 4 demonstrates that the problem exists regardless of the shape of the vessel. In this example, the vessel has a spherical shape and it can be seen that such undesirable compartmentalisation of product also occurs therein.

It is an object of the present invention to address and overcome this further problem.

SUMMARY OF THE INVENTION

According to the present invention there is provided a steam peeling vessel for rotation about an internal axis of rotation comprising at least one internal lifter having a longitudinal axis oriented at an oblique angle to the internal axis of rotation of the vessel. The internal axis of rotation may be along an axis of substantial symmetry of the vessel.

Preferably, the vessel comprises multiple lifters.

The multiple lifters may comprise a first lifter oriented at a first oblique angle to the axis of rotation, and at least a second lifter oriented at a second oblique angle to the axis of rotation.

The first and second oblique angles may be equal but opposite. For example the first lifter may be oriented at an obtuse, acute or right angle to the second lifter. The first lifter may be an incline whereas the second lifter may be a decline.

The angle of orientation may be the same between two consecutive lifters. The angle of orientation may change between two consecutive lifters. A combination of the two is possible in a single vessel.

The direction of incline may be the same between two consecutive lifters. The direction of incline may change between two consecutive lifters. Consecutive lifters may alternate in incline. A combination of the two/three is possible in a single vessel.

The multiple lifters may comprise a first lifter oriented at a first oblique angle to the axis of rotation, and a second lifter oriented at a second and different oblique angle to the axis of rotation.

The first and second lifters may be arranged end to end. Two or more lifters may be arranged end to end in the vessel to form a double-lifter. The first lifter of the double-lifter may be orientated at a first oblique angle to the axis of rotation of the vessel, and the second lifter orientated at a second oblique angle to the axis of rotation.

The double-lifter may therefore have a first portion orientated at a first oblique angle to the axis of rotation of the vessel, and a second portion orientated at a second oblique angle to the axis of rotation.

The first and second oblique angles may be equal but opposite. For example the first lifter may be oriented at an angle between zero and 180 degrees to the second portion. The double-lifter may comprise a bend along its length. The first lifter (first portion of the double-lifter) may be an incline whereas the second lifter (first portion of the double-lifter) may be a decline. Likewise the first portion may be a decline whereas the second portion may be an incline. The double-lifter may undergo at least one change of angle along its length. Such a double-lifter may be formed from a single unitary piece or may comprise multiple lifters laid or fixed end to end or otherwise connected together.

The first and second oblique angles may be unequal.

Each of the lifters may be defined by an upstanding portion of a false floor that is spaced from an interior wall surface of the pressure vessel. At least a portion of the false floor may be apertured for passage of condensate through the apertures of the false floor, so that condensate can be accumulated in the region between the false floor and the interior wall surface of the pressure vessel. At least a portion of the false floor may be non-apertured to provide a region for at least temporary retention of condensate accumulation during rotation of the vessel. Means for enabling removal of condensate from the region between the false floor and the interior wall surface of the pressure vessel may also be provided. Each of the lifters may define a closed region that is not in communication with the remainder of the interior space within the pressure vessel for the movement of gas or vapor between the closed region and the remainder of the interior space within the pressure vessel.

By orienting a lifter at an oblique angle (an angle other than parallel or perpendicular) to the axis of rotation, separation of the products from one another is increased, to ensure that each potato receives the same degree of exposure to steam during the steaming period. Product is redirected towards the centre of the vessel or to the periphery of the vessel, depending on the direction of incline of the lifter. Preferably a lifting is also achieved. Product that starts on the periphery of the vessel may be urged into the centre of the vessel or vice versa. Any lateral movement of the product along the axis of rotation is desirable. Each lifter imparts a translation of a product along the axis of rotation while being lifted. A translation having a lateral component and preferably a lifting component is achieved in respect of the products.

As a result, bunching potatoes during the lifting process is avoided. The batch of potatoes being lifted (and then falling) no longer does so as a single mass as the vessel rotates. Instead the batch moves as a plurality of individual objects.

Compartmentalisation of the potatoes is minimised if not avoided, and movement of the potatoes is maximised. The aim of each potato in a batch being subjected to the same amount of steam treatment is achieved, avoiding over peeling. This is turn results in shorter steam peeling times, steam saving and improved efficiency.

BRIEF DESCRIPTION OF DRAWINGS

The invention will now be described with reference to the accompanying drawings, of which FIGS. 5-16 illustrate a peeler vessel according to various embodiments of the present invention.

FIG. 1 shows a cross section of a prior art steam peeling vessel including lifters, taken along its axis of rotation.

FIG. 2 shows a further cross section of the prior art steam peeling vessel of FIG. 1, taken along line A-A.

FIG. 3 shows a cross section of the prior art steam peeling vessel of FIGS. 1 and 2 in use.

FIG. 4 shows a cross section of a similar prior art steam peeling vessel in use.

FIG. 5 shows a cross section of a steam peeling vessel in accordance with one embodiment of the invention, taken along its axis of rotation.

FIG. 6 shows a further cross section of the steam peeling vessel of FIG. 5, taken along line A-A.

FIG. 7 shows a cross section of a steam peeling vessel in accordance with a further embodiment of the invention, taken along its axis of rotation.

FIG. 8 shows a further cross section of the steam peeling vessel of FIG. 7, taken along line B-B.

FIG. 9 shows a cross section of a steam peeling vessel in accordance with a further embodiment of the invention, taken along its axis of rotation.

FIG. 10 shows a further cross section of the steam peeling vessel of FIG. 9, taken along line C-C.

FIG. 11 shows a cross section of a steam peeling vessel in accordance with one embodiment of the invention, taken along its axis of rotation.

FIG. 12 shows a further cross section of the steam peeling vessel of FIG. 11, taken along line A-A.

FIG. 13 shows a cross section of a steam peeling vessel in accordance with a further embodiment of the invention, taken along its axis of rotation.

FIG. 14 shows a further cross section of the steam peeling vessel of FIG. 13, taken along line B-B.

FIG. 15 shows a cross section of a steam peeling vessel in accordance with a further embodiment of the invention, taken along its axis of rotation.

FIG. 16 shows a further cross section of the steam peeling vessel of FIG. 15, taken along line C-C.

DETAILED DESCRIPTION OF DRAWINGS

Figure 2:
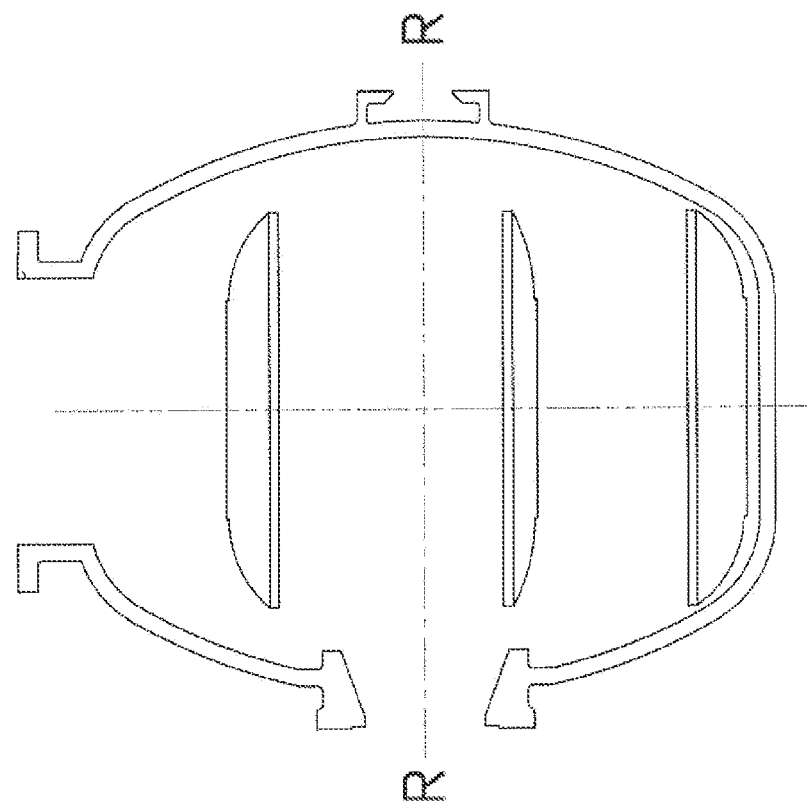
FIGS. 1-4 illustrate selected significant features of a prior art steam peeling vessel.
Figure 1:
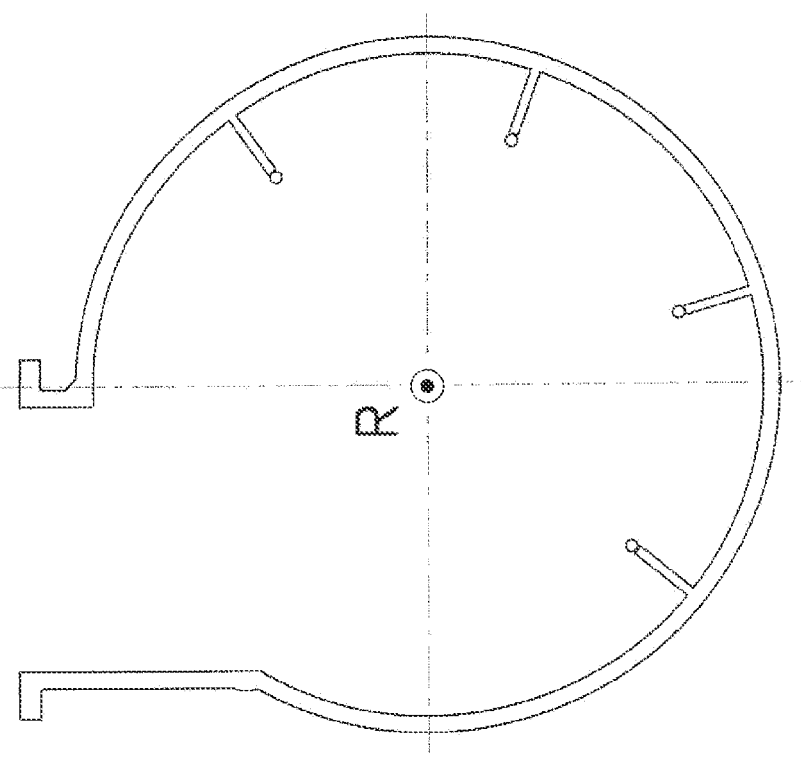
Figure 3:
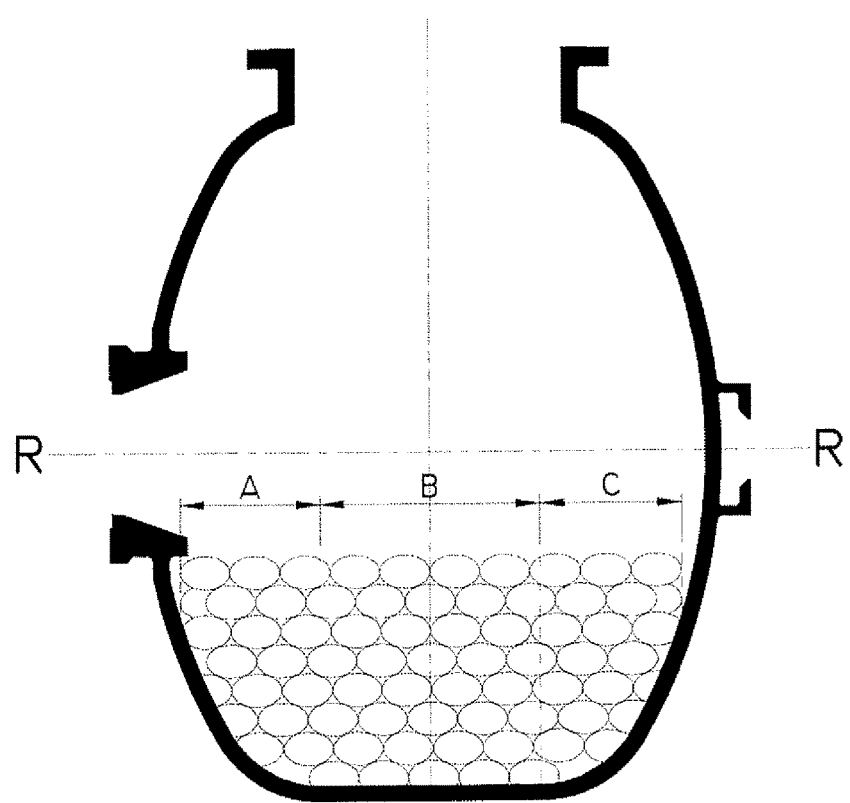
Figure 4:
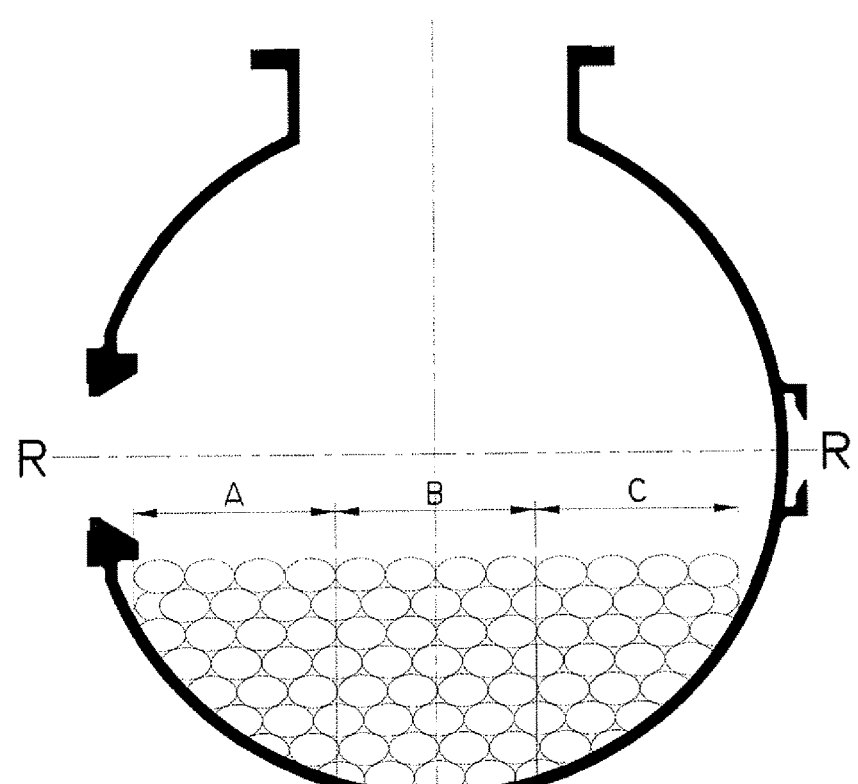

FIGS. 5 to 16 show multiple embodiments of a steam peeler vessel 1 in accordance with the present invention. As demonstrated in the drawings, the present invention is not limited to any particular shape of vessel, whether spherical, obloid, oblate spheroid, bottle-shaped or any other shape. In the embodiments of FIGS. 5 to 9, the vessel has a spherical form, in the embodiments of FIGS. 10 to 16, the vessel has an oblate spheroid form. Other forms of vessel are envisaged in accordance with the present invention.

In each embodiment, a plurality of lifters are shown, although the invention only requires one lifter to achieve an advantage over the prior art. The term lifter is intended to refer to any means for engaging with product as the vessel rotates to impart movement to the product. Preferably the movement includes a lateral movement of the product. The movement may also include a raising movement. The movement may also include a movement in the direction of rotation of the vessel. The lifters in these embodiment take the form of a plate extending from the inside wall of the vessel, but other forms of lifter other than plates are possible in accordance with the present invention. Each lifter in this embodiment protrudes from the inner wall of the vessel towards the centre of the vessel. They may be fixed or mounted to the inner wall or may form part of the wall itself. The shape of the plate is not important, rather its orientation. Any form of protrusion or projection from the inner wall of the vessel could be a lifter within the meaning of the present invention. The plate-like lifters in this embodiment have a flat plate form. In alternative embodiments the lifters may be curved or take another form. Further examples include but are not limited to a curved plate, a flap, a wedge shape, and a semi-circular protrusion.

Each lifter is oriented at an oblique angle to the axis of rotation of the vessel, as best seen in FIGS. 6, 8, 10, 12, 14 and 16. The arrows in these drawings show the achieved movement of product by the lifters as the vessel rotates.

FIG. 6 shows an example of a vessel 1 having a first lifter 12 oriented at a first oblique angle to the axis of rotation R-R, and a second lifter 14 or 16 oriented at a second oblique angle to the axis of rotation.

In FIG. 6, lifter 12 is shown to be oriented at a first oblique angle to the axis of rotation, and lifter 14 oriented at a second and different oblique angle to the axis of rotation. Likewise lifter 16 is oriented at a second and different oblique angle to the axis of rotation relative to lifter 12 or lifter 14.

In the embodiment of FIG. 6, the angle of orientation changes between two consecutive lifters 12, 14, 16, 13, for example lifters 12 and 16, where the angle of orientation of lifter 12 relative to the axis of rotation is greater than that of lifter 16 which slopes more gently. Lifter 12 has a steeper incline/decline.

In alternative embodiments the angle of orientation is the same between two consecutive lifters. For example in FIG. 10, the lifters 22, 23, 24, 25 share a common angle of orientation relative to the axis of rotation. In this embodiment, the direction of incline of lifter 23 is different to that of lifters 22 and 24 but the angle of incline remains the same. A combination of the two is possible in a single vessel, for example where in parts of the vessel consecutive lifters share the same angle of orientation, in other parts, consecutive lifters have different angles of orientation.

In the embodiment of FIG. 6, the direction of incline changes between two consecutive lifters, for example, between lifters 12 and 16, and also between lifters 16 and 14. In this embodiment the consecutive lifters alternate in incline.

In other embodiments the direction of incline is the same between two consecutive lifters. A combination of the two/three is possible in a single vessel, where in parts of the vessel consecutive lifters are inclined in the same direction, in other parts, consecutive lifters are inclined in different directions.

FIG. 8 shows an embodiment of vessel wherein two lifters 18, 19 are arranged end to end. The lifters form a double lifter 20. Lifter 18 is orientated at a first oblique angle to the axis of rotation of the vessel, and lifter 19 orientated at a second oblique angle to the axis of rotation. More than two lifters may be arranged end to end, to form a zig-zag or wavy combination of lifters/double-lifter.

In FIG. 8, the first and second oblique angles are equal but opposite. In this example the first portion is oriented at an acute angle to the second portion. Lifters 18 and 19 together form a double-lifter 20 comprising a bend 21 along its length. The bend need not be a sharp bend as shown in FIG. 8, a curve between the two lifters is also possible. The first lifter 18 is an incline whereas the second lifter 19 is a decline. In alternative embodiments the double-lifter 20 may be reversed to take a V-shape where the first lifter is a decline and the second lifter is an incline. Double-lifter 20 in FIG. 8 undergoes one change of angle along its length, but multiple changes are possible. Double-lifter 20 may be formed from a single unitary piece or may comprise multiple sections laid or fixed end to end or otherwise connected together. The double-lifter in this embodiment works like a snow plough in clearing the potatoes to the side as they come into contact with its leading faces.

In alternative embodiments of a double or two-part lifter, the first and second oblique angles may be unequal.

As demonstrated by the arrows in FIG. 6, each lifter in this embodiment serves to move product towards the edges of the vessel, away from the centre. Product that starts in the centre of the vessel may be urged to the periphery of the vessel. The product would undergo a lateral movement along the axis of rotation. Lifters 12 and 14 would induce a lateral movement from right to left. Lifter 16 would induce a lateral movement from left to right. Each lifter imparts a translation of a product along the axis of rotation while being lifted. A translation having a lateral component and a lifting component is achieved in respect of the products.

As demonstrated by the arrows in FIG. 8, each double-lifter 20 in this embodiment also serves to move product towards the edges of the vessel, away from the centre. The product would undergo a lateral movement along the axis of rotation. Lifter 18 of double-lifter 20 would induce a lateral movement from left to right. Lifter 19 would induce a lateral movement from right to left.

Figure 10:
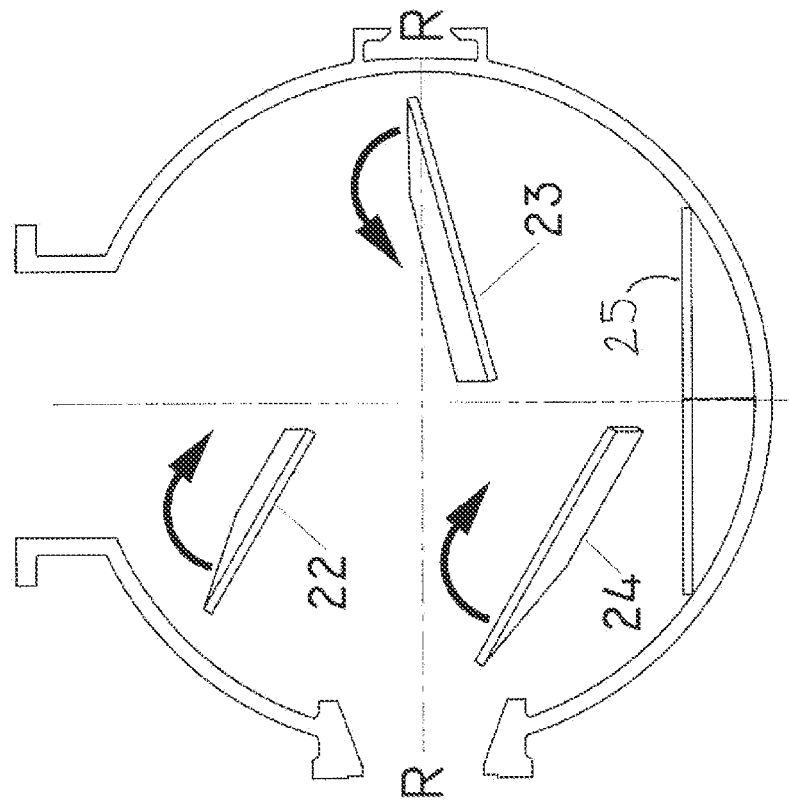
Figure 9:
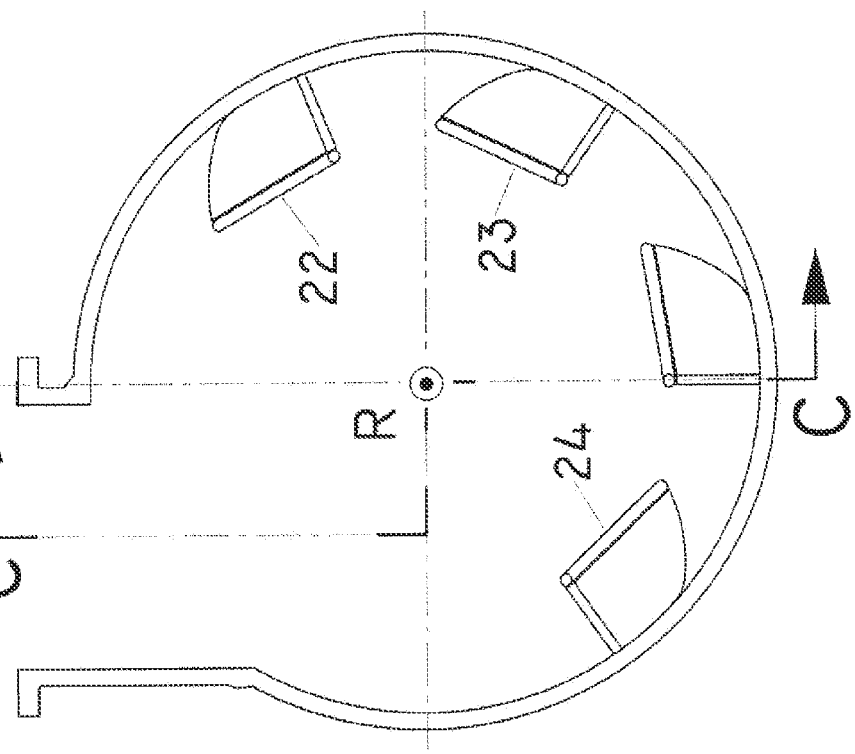

As demonstrated by the arrows in FIG. 10, each lifter in this embodiment serves to move product towards the centre of the vessel, away from the edges. Product that starts on the periphery of the vessel may be urged into the centre of the vessel. The product would undergo a lateral movement along the axis of rotation. Lifters 22 and 24 would induce a lateral movement from left to right. Lifter 23 would induce a lateral movement from right to left.

Figure 12:
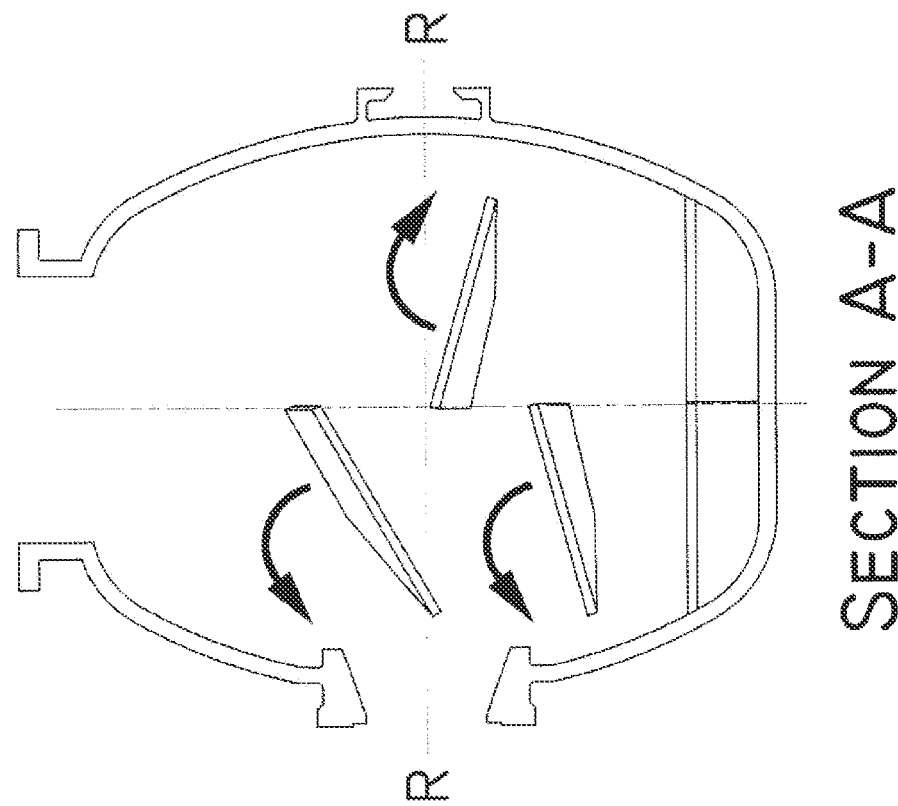
Figure 11:
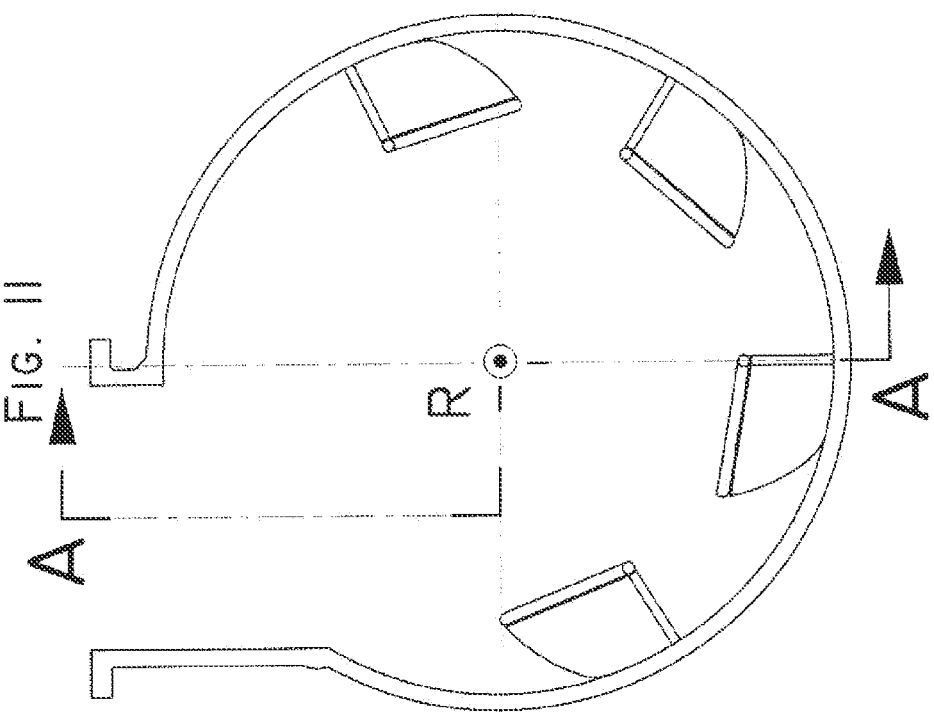
Figure 14:
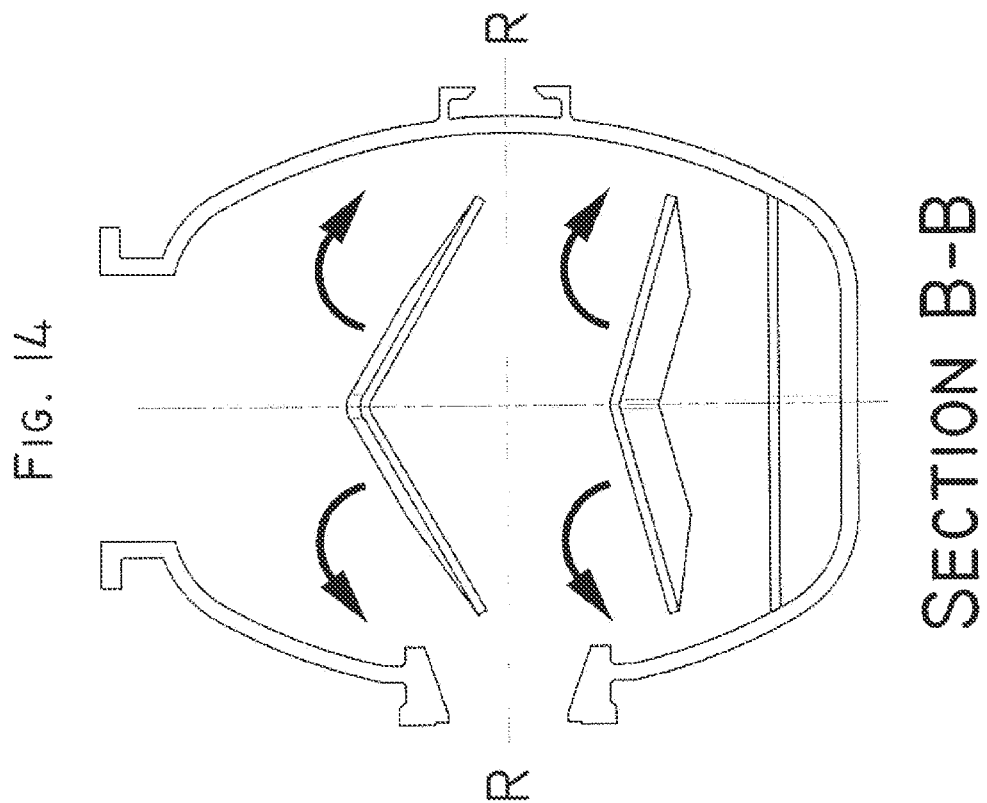
Figure 13:
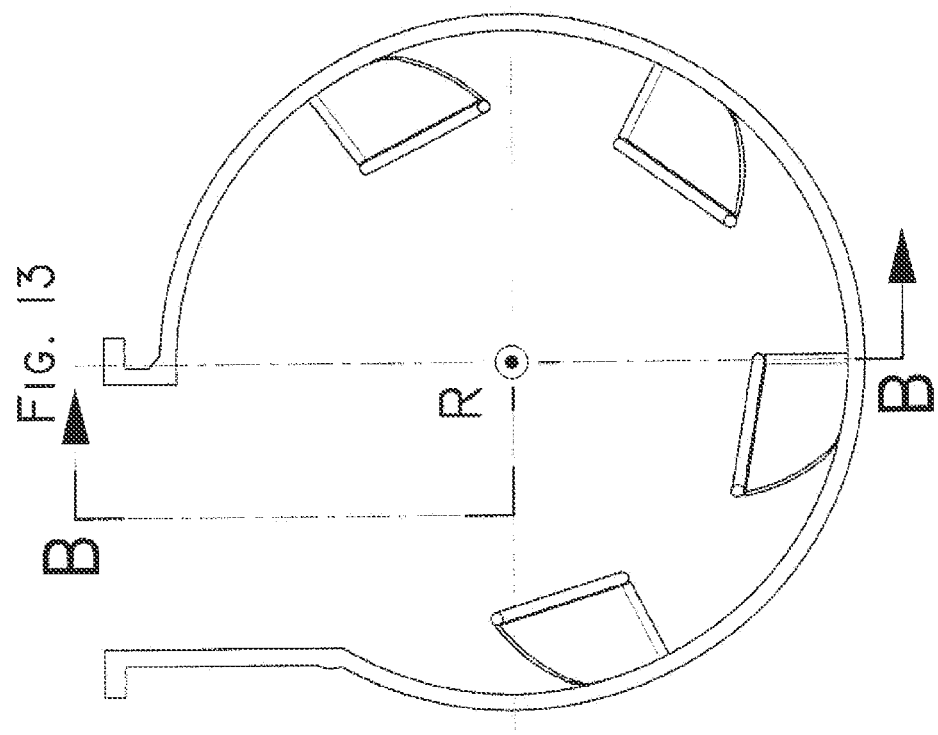
Figure 16:
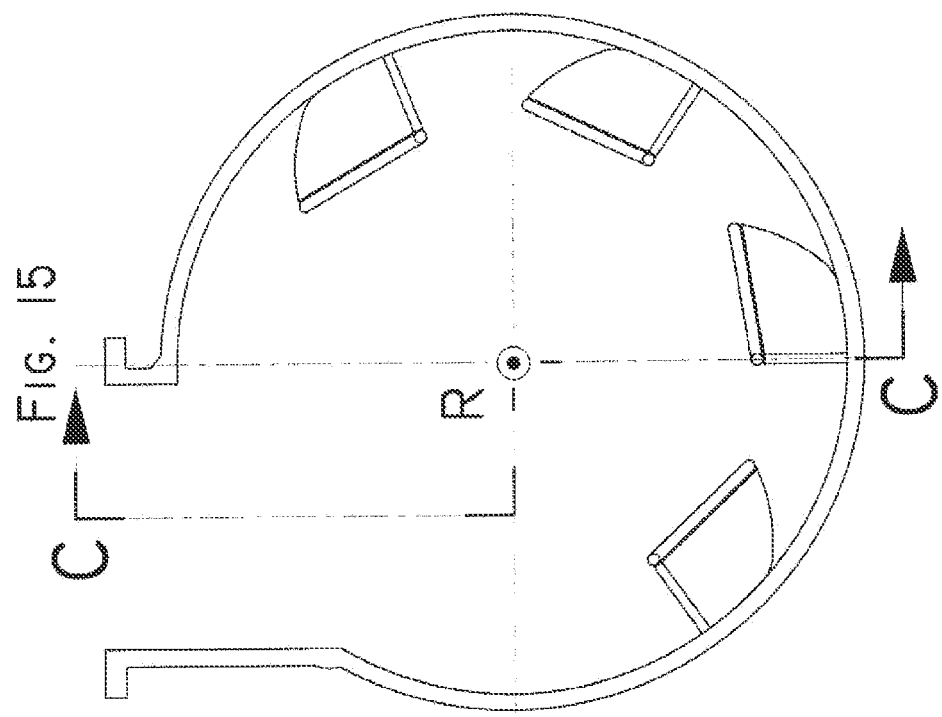
Figure 15:
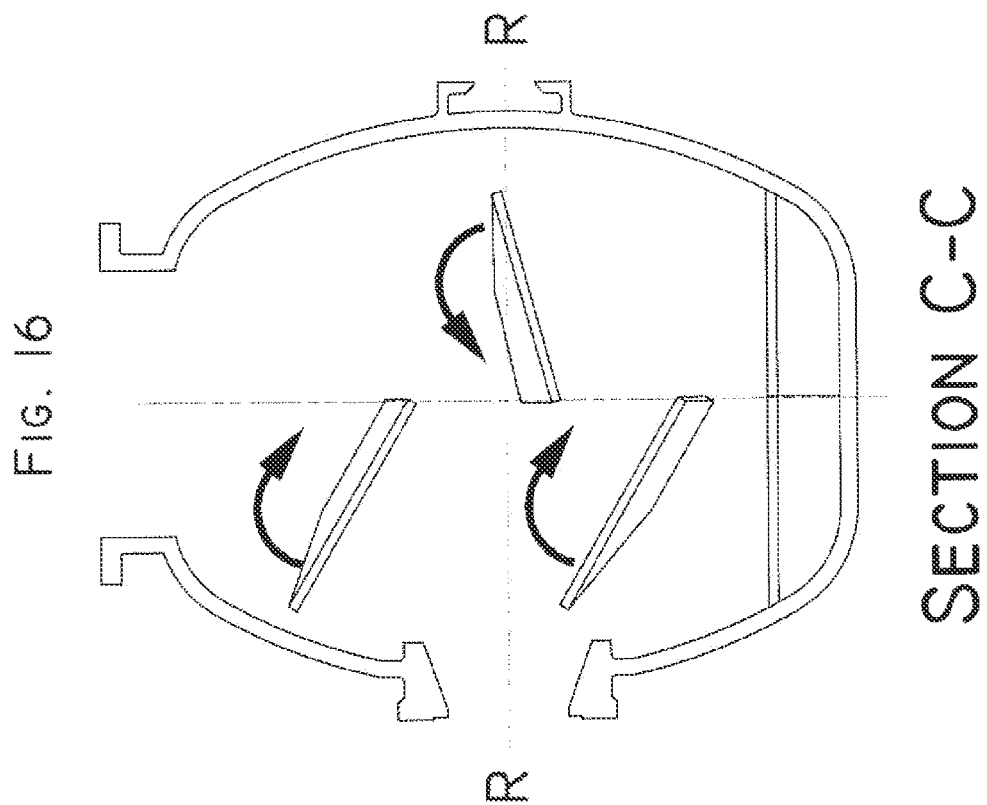

FIGS. 12, 14 and 16 show the same arrangement of lifters as those in FIGS. 6, 8 and 10, in a different shaped vessel. The lifters function in the same manor regardless of the shape of the vessel. Any number of lifters may be provided in these and other embodiments of the invention.

Each lifter imparts a translation of a product along the axis of rotation while being lifted. A translation having a lateral component and a lifting component is achieved in respect of the products.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. A steam peeling vessel for rotation about an internal axis of rotation, comprising at least one internal lifter having a longitudinal axis oriented at an oblique angle to the internal axis of rotation of the vessel, the internal axis of rotation of the vessel extending along a first direction, the at least one internal lifter being rotationally fixed to the steam peeling vessel, the at least one internal lifter being interrupted or discontinuous at a center of the vessel, the center being at a center of the vessel along the first direction, the at least one internal lifter being configured to urge product within the vessel radially relative to the center of the vessel.

2. The steam peeling vessel of claim 1, wherein the internal axis of rotation is along an axis of symmetry of the vessel.

3. The steam peeling vessel of claim 1, the at least one internal lifter comprising at least two internal lifters.

4. The steam peeling vessel of claim 3, the at least one internal lifter comprising a first lifter oriented at a first oblique angle to the axis of rotation, and at least a second lifter oriented at a second oblique angle to the axis of rotation.

5. The steam peeling vessel of claim 4, wherein the first and second oblique angles are equal but opposite.

6. The steam peeling vessel of claim 5, wherein the first lifter is oriented at an obtuse angle to the second lifter.

7. The steam peeling vessel of claim 4, wherein the first lifter is an incline and the second lifter is a decline.

8. The steam peeling vessel of claim 3, wherein the angle of orientation is the same between two consecutive lifters.

9. The steam peeling vessel of claim 3, wherein the angle of orientation changes between two consecutive lifters.

10. The steam peeling vessel of claim 3, wherein the direction of incline changes between two consecutive lifters.

11. The steam peeling vessel of claim 3, wherein the at least two lifters comprise a first lifter oriented at a first oblique angle to the axis of rotation, and a second lifter oriented at a second and different oblique angle to the axis of rotation.

12. The steam peeling vessel of claim 3, wherein the at least two lifters are arranged end to end.

13. The steam peeling vessel of claim 12, wherein a first lifter of the at least two lifters is orientated at a first oblique angle to the axis of rotation of the vessel, and a second lifter of the at least two lifters is orientated at a second oblique angle to the axis of rotation.

14. The steam peeling vessel of claim 13, wherein the first and second oblique angles are equal but opposite.

15. The steam peeling vessel of claim 13, wherein the first and second oblique angles are unequal.

16. The steam peeling vessel of claim 3, wherein each of the at least two lifters undergoes at least one change of angle along its length.

17. The steam peeling vessel of claim 1, wherein the at least one internal lifter comprises a leading face and an outer edge, wherein the leading face is oriented at the oblique angle.

18. The steam peeling vessel of claim 17, wherein the leading face is configured to impart a translation of product within the vessel along the internal axis of rotation when the vessel is rotated.

19. The steam peeling vessel of claim 1, wherein the at least one internal lifter and an outermost wall of the steam peeling vessel are rotationally fixed and are configured to rotate together during steam peeling.

20. The steam peeling vessel of claim 1, wherein the at least one internal lifter extends from an inside wall of the steam peeling vessel.

* * * * *